2,883,656
ECHO OBJECT-DETECTING SYSTEM SENSITIVE TO OBJECT VELOCITY

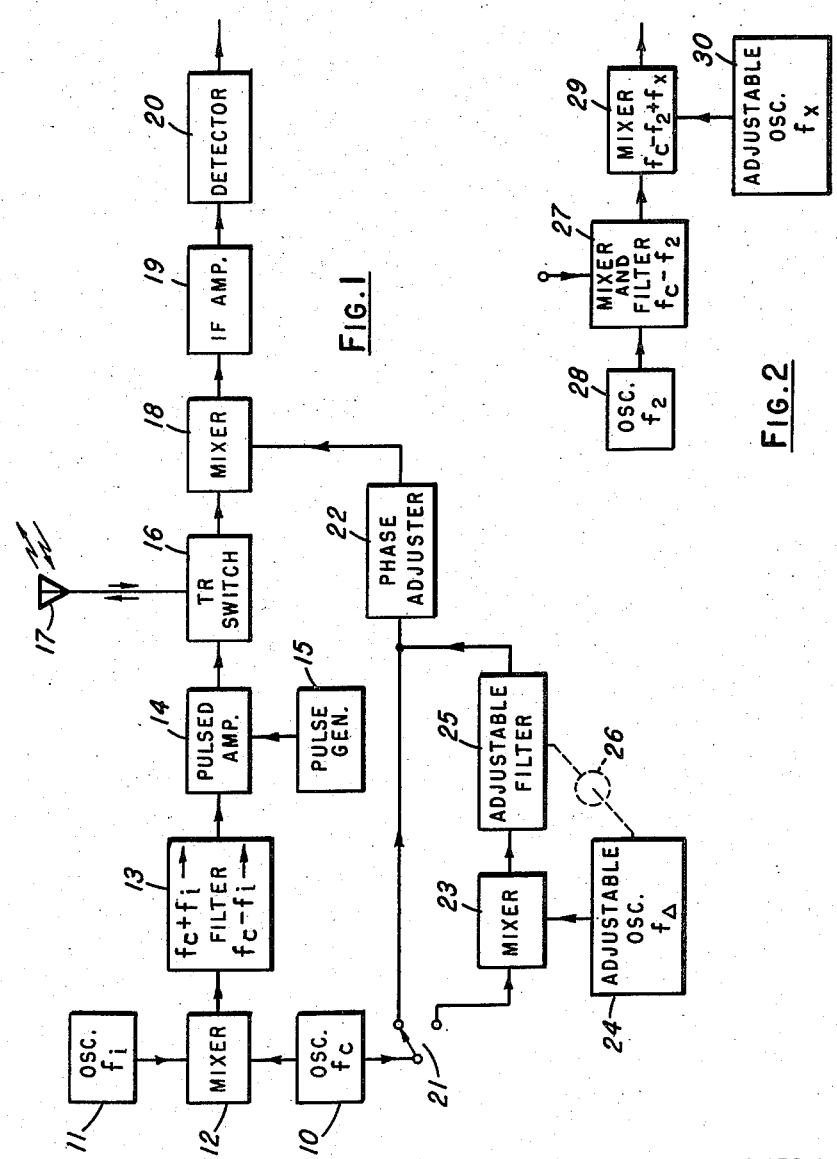

James L. Russell, Sun Valley, Calif., assignor to Bendix Aviation Corporation, North Hollywood, Calif., a corporation of Delaware Application July 30, 1956, Serial No. 601,010

11 Claims. (Cl. 343—7.7)

This invention relates to systems for detecting distant objects by echo waves reflected therefrom, in which objects of one radial velocity with respect to the observing station are suppressed so as not to mask or blank objects of other radial velocities. Commonly, it is desired to suppress echoes from stationary objects that would otherwise obscure echoes from a moving object the presence of which is to be detected. All such systems depend for their operation on the well known Doppler effect which causes echoes from approaching or receding objects to be of higher or of lower frequency, respectively, than echoes from stationary objects.

An object of the invention is to provide a simple and effective method of utilizing the Doppler effect to distinguish between objects of different radial velocities.

Another object is to provide such a method that is applicable to pulse type echo distance-measuring systems.

A more specific object is to provide a velocity-sensitive echo-detecting system involving simpler and more dependable apparatus having fewer critical components than prior known systems for accomplishing the same result.

Other more specific objects and features of the invention will appear from the following description.

Most of the prior known systems utilizing the Doppler effect to distinguish moving objects from stationary objects have been of the continuous wave type in which the emitted wave is frequency-modulated and mixed with echoes to generate a beat wave the frequency of which is a measure of the distance to the reflecting object. It is well known that pulse type systems in which distance is determined by directly measuring the time elapsing between the transmission of a pulse and the return of the echo pulse have many practical advantages over the continuous wave type, at least for certain purposes. However, the only prior, pulse Doppler systems known to me are highly complex and require the examination of many successive echo pulses to extract the necessary Doppler shift information.

The present invention is a comparatively simple and quickly responsive system or method applicable to pulse type systems for utilizing the Doppler effect to cancel the effect of echoes from an object or objects of a different velocity than a desired object.

In accordance with the invention, a pair of waves of different frequency are transmitted and reflected back from distant objects as pairs of echo waves. The two waves of each pair of echo waves have the same frequency separation, but the pairs of echo waves from moving objects are shifted bodily in the frequency spectrum relative to the echo waves from the stationary object. All the received echo waves are heterodyned with a local wave of the median frequency of the pair of echo waves from an undesired object, and the resultant composite beat wave is detected to produce an output signal which is utilized by well known methods to produce an indication. The output signal is a function of the algebraic sum of the beat waves between the local wave and all the echo waves. The pair of echo waves from the undesired object, being equally displaced in frequency above and below the local wave, produce therewith a pair of beat waves of identical frequency and cancel if they are opposite in phase. They can be made opposite in phase by proper circuit design. All pairs of echo waves from objects having relative radial velocity with respect to the undesired object have median frequencies different from the local wave, and hence the two waves of each pair beat with the local wave to produce two beat waves of different frequencies which cannot cancel and hence appear in the output signal. By transmitting the original pair of waves in pulses, the output signal is produced in the form of pulses, the timing of which can be used to indicate object distance by standard techniques of pulse echo systems.

A full understanding of the invention may be had from the following detailed description when read in connection with the drawing, in which:

Fig. 1 is a schematic diagram illustrating the application of the invention to a pulse radar system.

Fig. 2 is a schematic diagram showing a modification of a portion of the circuit of Fig. 1.

Referring to Fig. 1, a carrier wave of high frequency $f_c$ from an oscillator 10 and a wave of much lower frequency $f_i$ (termed for reference purposes the IF wave) from an oscillator 11 are heterodyned in a mixer 12 to produce two side bands of frequencies $f_c+f_i$ and $f_c-f_i$, respectively. The side bands are separated from the carrier and IF waves by a filter 13 and delivered to a pulsed amplifier 14, which is gated by pulses from a pulse generator 15. The amplified output pulses are delivered through a conventional TR switch 16 to an antenna 17.

Echo pulses received on the antenna 17 are passed by the TR switch 16 to a mixer in which they are heterodyned with a locally derived reference wave, and the output is amplified by an IF amplifier 19, detected by a detector 20, and the detected output utilized in conventional manner to produce an indication.

The reference wave applied to the mixer 18 must be of the median frequency of the pair of echo waves resulting from reflection of the transmitted side band waves by an object to be suppressed, hereinafter referred to as the first object. When the first object has zero radial velocity with respect to the antenna 17, the first pair of echo waves reflected from it are of the same frequencies as the transmitted pair of waves, namely, $f_c+f_i$ and $f_c-f_i$, respectively, and the carrier wave frequency $f_c$ is the median frequency; hence, a portion of the output of oscillator 10 may be applied without frequency change through a switch 21 and a phase adjuster 22 to the mixer 18.

When the first object has radial movement with respect to the antenna 17, the first pair of echo waves are shifted upwardly or downwardly in the frequency spectrum by the Doppler effect, and their median frequency is shifted correspondingly so that it differs from the frequency $f_c$. Under such conditions, the reference wave may be generated by actuating the switch 21 to divert a portion of the output of oscillator 10 to a mixer 23 in which it is heterodyned with a low-frequency wave of the Doppler shift frequency $f_\Delta$ from an adjustable-frequency oscillator 24, to generate side bands of frequencies $f_c+f_\Delta$ and $f_c-f_\Delta$, the appropriate one of which side bands is selected by an adjustable filter 25 and applied through the phase adjuster 22 to the mixer 18. Preferably, the oscillator 24 and filter 25 are adjustable simultaneously by a single control element 26.

It has previously been mentioned that the pair of waves of frequency $f_i$ in the output of mixer 18 resulting from heterodyning the first pair of echo waves with the reference wave of their median frequency will cancel only if they are opposite in phase. They will be opposite in phase only when a certain phase relation exists between the echo waves and the reference wave in mixer 18. This certain phase relation may occur naturally, but usually it is necessary to provide for phase correction as by the phase adjuster 22.

Since only pairs of echo waves the median frequency of which is the same as the reference wave will cancel, echo waves from any second object of different radial velocity than the first object will not cancel and will appear in the detected output.

Usually the objects to be suppressed are those stationary with respect to the earth. If the echo detection system is a stationary installation, the reference frequency is then the carrier frequency $f_c$, and the oscillator 24, mixer 23 and filter 25 can be eliminated.

On the other hand, if the system is mobile and moving, echo waves from stationary objects will have a Doppler shift, and the reference frequency must be correspondingly shifted from the frequency $f_c$.

In the system of Fig. 1, if approaching objects are to be suppressed, the upper side band of frequency $f_c+f_\Delta$ is selected by the filter 25. On the other hand, if receding objects are to be suppressed, the lower side band of frequency $f_c-f_\Delta$ is selected by the filter 25.

In a scanning mobile system which may scan in various or all directions, sometimes directly ahead and other times directly astern, the median frequency of the echoes from stationary objects may shift continuously between $f_c+f_\Delta$ and $f_c-f_\Delta$, and it may be desirable to use a different method of generating the local reference wave. A system that may be used is shown in Fig. 2, which is substituted for the mixer 23 and oscillator 24 in Fig. 1.

In Fig. 2, the wave of frequency $f_c$ from oscillator 10 (Fig. 1) is first heterodyned in a mixer 27 with a wave from an oscillator 28 of frequency $f_2$ at least as great as the maximum Doppler shift frequency $f_{\Delta max}$, resulting from the motion of the mobile station, to produce a selected side band of frequency $f_c-f_2$ at least as low as the median frequency of pairs of echoes from stationary objects directly astern. The output of mixer 27 is then heterodyned with the output of an adjustable oscillator 30 in a mixer 29, the output of which is fed to the adjustable filter 25 of Fig. 1. The adjustable oscillator 30 may be varied in frequency simultaneously with the filter 25 by the single control 26. In the simplest case, in which $f_2$ is the maximum Doppler shift frequency $f_{\Delta max.}$, the frequency range of oscillator 30 is from zero to twice the max. Doppler shift frequency or $2f_{\Delta max.}$, and the frequency of the selected output of mixer 29 (the reference wave) is $f_c-f_{\Delta max.}+f_x$. When scanning directly astern, oscillator 30 is adjusted for zero frequency, so that the output of mixer 29 contains the desired reference wave frequency $f_c-f_{\Delta max.}$. When scanning directly abeam, adjustment of oscillator 30 to deliver a frequency of $f_{\Delta max.}$ produces the desired reference wave frequency $f_c$. When scanning directly ahead, adjustment of oscillator 30 to deliver a frequency of $2f_{\Delta max.}$ produces the desired reference wave frequency of $f_c+f_{\Delta max.}$. Obviously, the same result will be obtained if the frequencies of both oscillators 28 and 30 are increased by the same amount. This may be desirable to avoid having to employ an oscillator 30 capable of operating at very low frequencies.

When the purpose of varying the frequency of the reference wave is to blank out stationary objects in all directions as viewed by a scanning radar on a moving craft, the frequency range of the adjustable oscillator 24 in Fig. 1, or 30 in Fig. 2, is determined by the speed of the craft and can be set accordingly. The rate of change of the frequency is determined by the scanning speed, and can be synchronized therewith.

An application of the invention to a radar system has been described; however, the invention is equally applicable to sonar systems utilizing sound waves in water and also systems utilizing sound waves in air. Regardless of the transmission medium employed, the principles are the same.

Although for the purpose of explaining the invention a particular embodiment thereof has been shown and described, obvious modifications will occur to a person skilled in the art, and I do not desire to be limited to the exact details shown and described.

I claim:

1. An echo object-detecting system for distinguishing between first and second objects having a differential radial velocity with respect to a distant station, said system comprising, at said station: means for generating and transmitting simultaneously a pair of waves the frequencies of which are different but fixed relative to each other; means for receiving first and second pairs of echo waves resulting from reflection of said pair of transmitted waves from said first and second objects, respectively; means for generating a reference wave of the median frequency of said first pair of echo waves and of such phase relative thereto as to beat therewith to produce a first pair of beat waves of equal frequency and opposite phase; means for heterodyning said reference wave with said received first and second pairs of echo waves to generate a composite beat wave including, as components, said first pair of beat waves of equal frequency and opposite phase by interaction between said reference wave and said first pair of echo waves, and a second pair of beat waves of frequencies different from each other, by interaction between said reference wave and said second pair of echo waves; and means for detecting said composite beat wave to produce an output signal corresponding to the algebraic sum of its components; whereby said first pair of beat waves of equal frequency and opposite phase cancel each other, and said output signal is a function of said second pair of echo waves from said second object independent of said first pair of echo waves from said first object.

2. A system according to claim 1 in which said means for generating said transmitted pair of waves comprises: a source of a wave of the median frequency between the frequencies of said pair of transmitted waves; a source of a wave of frequency half the difference frequency between said pair of transmitted waves; and means for mixing the waves from said last-mentioned two sources and deriving therefrom, as side bands of said last-mentioned median frequency wave, said transmitted pair of waves.

3. A system according to claim 1 in which said means for generating said reference wave is continuously variable as to frequency.

4. A system according to claim 1 in which said transmitting means includes means for transmitting said two waves in short pulses at a repetition period greater than the maximum echo return time.

5. A system according to claim 1 in which said means for generating said reference wave comprises: a first source of a wave of frequency less than said median frequency of said transmitted waves and at least as low as the minimum median frequency of said first pair of echo waves resulting from expanding range between said first object and said station; a second variable-frequency wave source of frequency variable between a low value equal to the frequency difference between said wave from said first source and said minimum median frequency of said first pair of echo waves resulting from said expanding range, and a high value equal to the frequency difference between said wave from said first source and the maximum median frequency of said first pair of echo waves resulting from contracting range between said first object and said station; and means for heterodyning said waves from said first and second sources and deriving therefrom the upper side band as said reference frequency.

6. A system according to claim 1 in which said means for generating said reference wave comprises: a first source of a wave of frequency differing from said median frequency of said transmitted waves a predetermined amount at least as great as the maximum Doppler shift between said transmitted waves and said first echo waves; a second variable frequency wave source having a frequency range twice said maximum Doppler shift and a minimum frequency equal to the difference between the frequency of said first source and the median frequency of said first pair of echo waves when subjected to said maximum Doppler shift; and means for heterodyning said waves from said first and second sources and deriving therefrom a side band wave as said reference wave.

7. A system according to claim 6 in which said first source comprises: a third source of a wave of frequency fixed with respect to and less than the frequency of said transmitted waves and at least as great as the maximum Doppler shift between said transmitted waves and said first echo wave; a source of a wave of the median frequency of said transmitted waves; and means for heterodyning said fixed frequency wave with said median frequency wave and deriving therefrom a side band wave of said median frequency wave.

8. A system according to claim 2 in which said source of said reference wave includes said source of said wave of the median frequency of said pair of transmitted waves, and means for deriving said reference wave from a portion of the output of said last-mentioned source.

9. A system according to claim 8 including means for varying the phase of said last-mentioned derived wave.

10. A system according to claim 8 in which said source of said reference wave includes means for shifting the frequency of a portion of the output of said source of said wave of the median frequency of said transmitted waves.

11. A system according to claim 10 in which said means for shifting the frequency comprises a source of a wave of the Doppler shift frequency between said transmitted waves and said first pair of echo waves; and means for heterodyning said wave of the median frequency of said transmitted waves with the wave of said Doppler shift frequency to produce said reference wave.

References Cited in the file of this patent

UNITED STATES PATENTS 2,695,995     Cauchois _____ Nov. 30, 1954